Jan. 29, 1929.                                                    1,700,286
T. DUGAN
SEPARABLE CUTTING AND THRASHING MACHINE
Filed Feb. 16, 1926          2 Sheets-Sheet 1
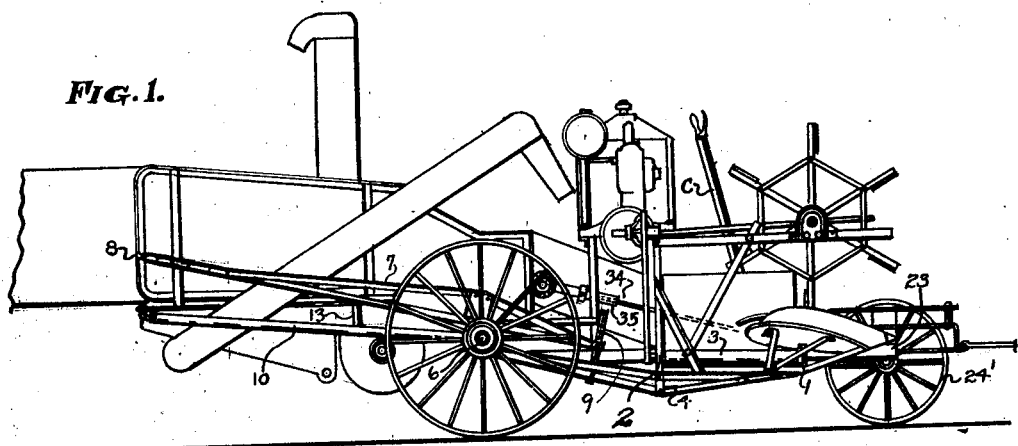
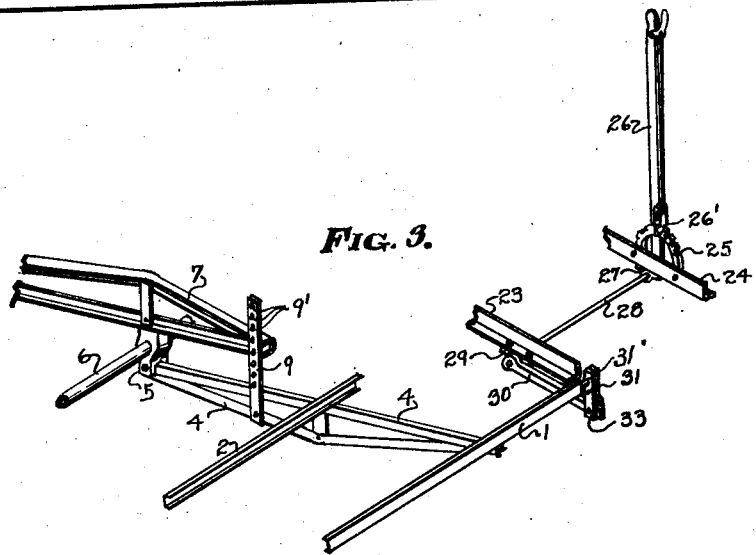
INVENTOR.
Thomas Dugan
BY
U. G. Charles
ATTORNEY.

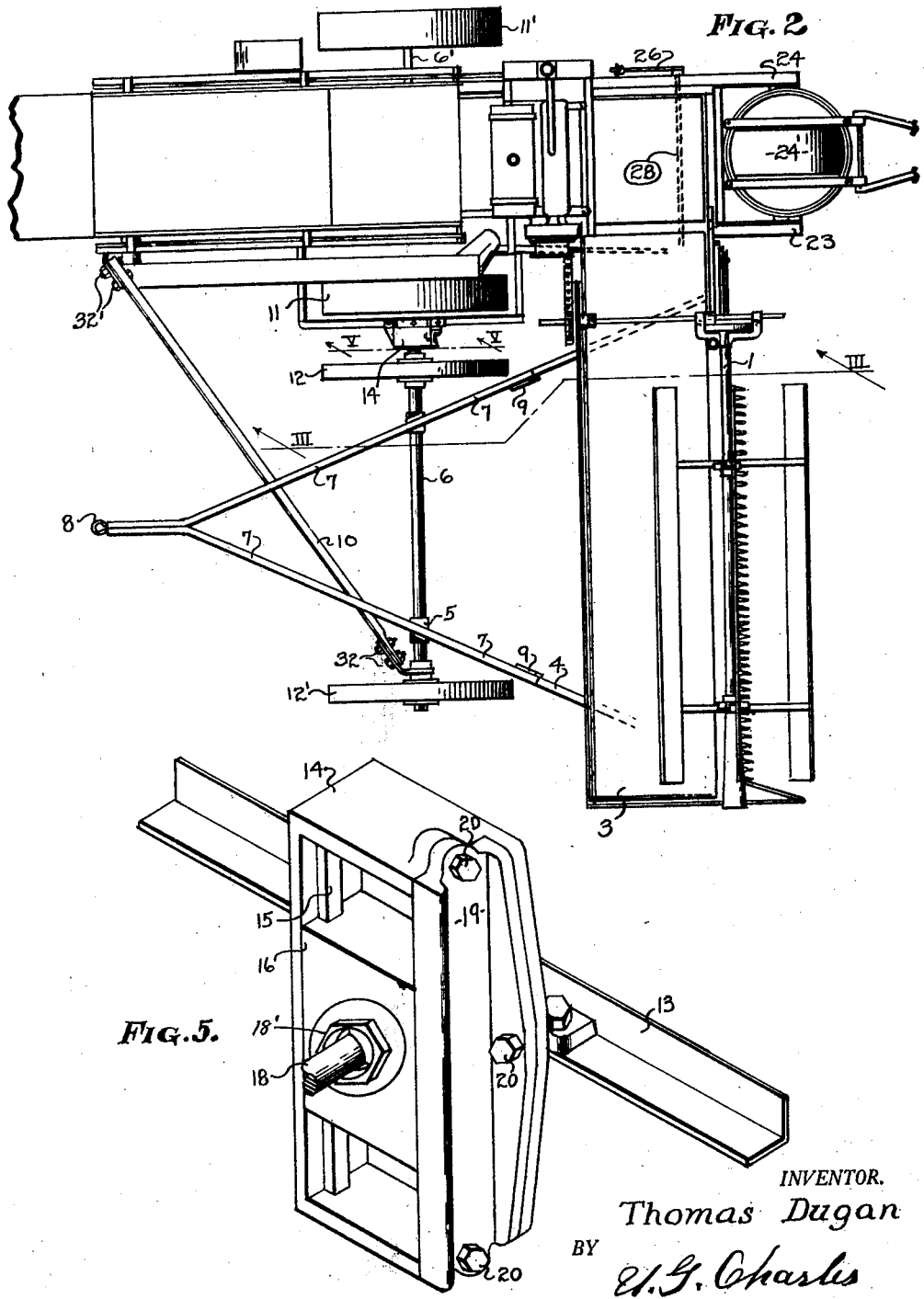

Patented Jan. 29, 1929.

1,700,286

UNITED STATES PATENT OFFICE.

THOMAS DUGAN, OF WICHITA, KANSAS.

SEPARABLE CUTTING AND THRASHING MACHINE.

Application filed February 16, 1926. Serial No. 88,587.

My invention relates to a separable cutting and thrashing machine.

The chief object of my invention is to separate the cutting mechanism from the thrashing mechanism, each having their individual conveying means.

A further object of my invention is the vertically adjusting means at the connection of the mechanisms accommodating for the irregularities of the ground surface.

A still further object of my invention is that when the parts are separated, they may be connected for transition, reducing the excess width if the device was not so made to separate.

A still further object of my invention is to provide a simple and effective counterbalance means for the sickle and conveyor, the said means functioning as a tongue to convey that portion of the device independently.

These and other objects will hereinafter be more fully explained.

Referring to the drawings:

Fig. 1 is a side view of the combined thrasher, with the truck attached ready for action.

Fig. 2 is a top view of the mechanism.

Fig. 3 is a detail perspective view of the adjusting means on the cutter bar, taken on line III—III in Fig. 2.

Fig. 4 is a detail sectional view of the mechanism employed to attach the truck axle to the thrashing machine.

Fig. 5 is a detail perspective view of Fig. 4 taken on line V—V in Fig. 2.

A channel iron 1 is adapted to carry the sickle or cutter bar, 2 is a second channel iron which in combination with channel iron 1 forms a frame in which rollers are trunnioned as supporting means for the conveyor 3. This frame is mounted on a pair of truss arms 4, the rear ends of which are pivotally carried by brackets 5, said brackets being mounted on the truck axle 6. On the upper side of the brackets 5 is mounted a second pair of truss arms 7, the said arms are joined together at their outer ends and provided with a loop 8, which may be used as an attaching means. The arms 7 and 4 are connected by vertically positioned straps 9; said straps being perforated as at 9' as means of adjustment, said perforations engaging with pins in the ends or bolts in the ends of the arms 7 adjacent thereto.

On the outer ends of arms 7 a weight (not shown) may be placed which will act as a counterbalance for the cutter bar and conveyor. A pipe 10 is attached to the frame of the thrashing machine and to the outer end of the truck as a means for keeping the axles 6 and 6' in axial alignment. On axle 6' is mounted the thrasher carrying wheels 11 and 11'. The truck is provided with wheels 12 and 12'. The wheels 11 and 12 being in close proximity and subject to irregularities of the ground surface, and to insure continuous traction for both wheels I have placed a frame 13 around the wheel 11 which is fastened to the frame of the thrasher. On this frame is mounted a box like housing 14 as shown in Figures 4 and 5, the interior of which is provided with tongues 15, adapted to receive a block 16 having a socket therein adapted to receive a ball 17 which is integral with the shaft 18; the said ball having a collar 18' threadedly connected to the said block as retaining means for the ball. One side of the housing 14 is provided with a plate 19, adapted to be detached by removing the cap screws 20, thereby allowing the block 16 to be removed from the housing 14. The block 16 is adapted to slide vertically in the housing 14, which will accommodate for the irregularities of the ground surface. On the axle 6 is mounted a wheel 12, held in place by collars 21 and 21', and the shaft 18 being inserted in the end of the pipe 6 and held firmly therein by bolts 22 and 22' as shown in Fig. 4, and being the means for connecting the thrasher and the truck at the axle line while the standing grain is being cut and thrashed. Heavy angle irons 23 and 24 form the frame of the thrasher, and on the forward extending ends thereof is positioned a guide wheel 24' and means for drawing the machine. On the member 24 is a notched sector 25 on which operates a lever 26 having a pawl 26' operatively attached thereto. On the under side of the angle iron 24 is a bearing 27 in which is mounted a shaft 28, said shaft being rigidly connected to the end of the lever 26. On the under side of the angle iron 23 is a bearing 29 supporting the opposite end of said shaft 28. On the shaft 28 is mounted an arm 30, and between the outer end of the arm 30 and the channel iron 1 is pivotally mounted a connecting link 31 having a perforation in the upwardly extending end thereof adapted to receive a pin 31' loosely engaging thereon, said pin attached to the end of channel iron 1. By actuating the lever 26 the channel iron 1 is raised or lowered. This is very easily manipulated, due to the counterbalance feature above described.

To remove the cutter bar and conveyor truck from the thrasher, bolts 32 and 32' are removed, disconnecting the member 10. By removing bolt 33 where shown in Fig. 3 and cap screws 20 where shown in Fig. 5 the truck may then be pushed forward and the shaft 34 will slip from the socket 35 where shown in Fig. 1 (shaft 34 and socket 35 is the means for transmitting power to the sickle), and the cutter bar and conveyor is independent of the thrasher and is mounted on its respective wheels for individual transition.

Such modifications may be employed as lie within the scope of the appended claims.

Having thus described my invention, what I claim as new and desire to secure by Letters Patent is:—

1. In a separable cutting and thrashing machine, a cutting mechanism and a thrashing mechanism, a vertically sliding block carried by the thrashing mechanism, a socket in said block, and a collar threadedly engaging the socket, a pipe functioning as an axle, and wheels to carry the same, a shaft inserted in the end of the pipe and rigidly attached thereto, a ball on the end of the shaft to engage in the socket as rockable means for the cutting mechanism, a pair of arms attached to the sickle frame, said arms converging rearward and centrally engaging on the pipe or axle as a fulcrum point, a weight attached to the rear end of the arms to function as a counter balance for the cutting mechanism, a reel and a sickle bar for the cutting mechanism, said bar and reel actuated by the thrashing mechanism.

2. In a separable cutting and thrashing machine, thrashing and cutting mechanisms detachably arranged, the cutting mechanism having rearwardly positioned arms converging and having a loop at the ends thereof as hitching means to convey the cutting mechanism independently of the thrashing mechanism.

3. In a separable cutting and thrashing machine, a cutting and thrashing mechanism of the kind described, a socket in a vertically sliding block carried by the thrashing mechanism, a pair of wheels having an axle as conveying means for the cutting mechanism, a ball on one end of the axle to engage in the socketed block carried by the thrashing mechanism, a collar threadedly engaging in the socket and carried by the ball when detached by which means the thrashing and cutting mechanism may be separated, removable means to connect the outer end of the axle to the thrashing mechanism, and a pin on the sickle carrying bar detachably engaging with the sickle adjusting means carried by the thrashing mechanism, all as means to disengage the cutting mechanism from the thrashing mechanism for separate transportation.

THOMAS DUGAN.